United States Patent [19]

Brahm et al.

[11] Patent Number: 4,494,193
[45] Date of Patent: Jan. 15, 1985

[54] DEADLOCK DETECTION AND RESOLUTION SCHEME

[75] Inventors: David J. Brahm, Naperville; James M. Grinn, Warrenville; Edward L. Hepler, Woodridge; John M. Sullivan, Lisle, all of Ill.

[73] Assignee: AT&T Bell Laboratories, Murray Hill, N.J.

[21] Appl. No.: 430,396

[22] Filed: Sep. 30, 1982

[51] Int. Cl.³ .............................................. G06F 1/00
[52] U.S. Cl. .................................. 364/200; 340/825.5
[58] Field of Search ... 364/200 MS File, 900 MS File; 340/825.5, 825.51

[56] References Cited

U.S. PATENT DOCUMENTS

| 4,189,771 | 2/1980  | Roever         | 364/200 X |
| 4,209,839 | 6/1980  | Bederman       | 364/200   |
| 4,231,086 | 10/1980 | Tarbox et al.  | 364/200   |
| 4,244,018 | 1/1981  | Mui            | 364/200   |
| 4,257,099 | 3/1981  | Appelt         | 364/200   |
| 4,318,182 | 3/1982  | Bachman et al. | 364/200   |
| 4,403,285 | 9/1983  | Kikuchi        | 364/200   |

OTHER PUBLICATIONS

D. J. Rypka and A. P. Lucido, "Deadlock Detection and Avoidance for Shared Logical Resources", IEEE Transactions on Software Engineering, vol. SE-5, No. 5, pp. 465-471, (Sep. 1979).
J. Nissim, "DMA Controller Capitalizes on Clock Cycles to Bypass CPU", Computer Design, pp. 117-124, (Jan. 1978).
G. D. Kraft and W. N. Toy, Mini/Microcomputer Hardware Design, pp. 432-450, (Prentice-Hall, Inc., 1979).

Primary Examiner—Raulfe B. Zache
Attorney, Agent, or Firm—P. Visserman; D. Volejnicek

[57] ABSTRACT

In a communication system which includes a plurality of stations interconnected for communications by a first bus, a second station includes a device, such as a processor, and a resource, such as a memory or a peripheral unit, interconnected for communication by a second bus. An interface mechanism connecting the first bus with the second bus allows the device to access the first bus over the second bus, and allows a first station to access the resource via the first and second buses. Deadlock detection circuitry detects cotemporaneous attempts by the device to access the first bus and attempts by the first station to access the resource. Deadlock resolution circuitry responds to deadlock detection by disconnecting the device from the second bus to allow the first station to access the resource, and by reconnecting the device to the second bus when the first station ceases to access the resource. If the device is operating under program control, the deadlock detection and resolution are transparent to the program.

44 Claims, 7 Drawing Figures

MICRO BUS 36 READ PROTOCOL

MICRO BUS 36 WRITE PROTOCOL

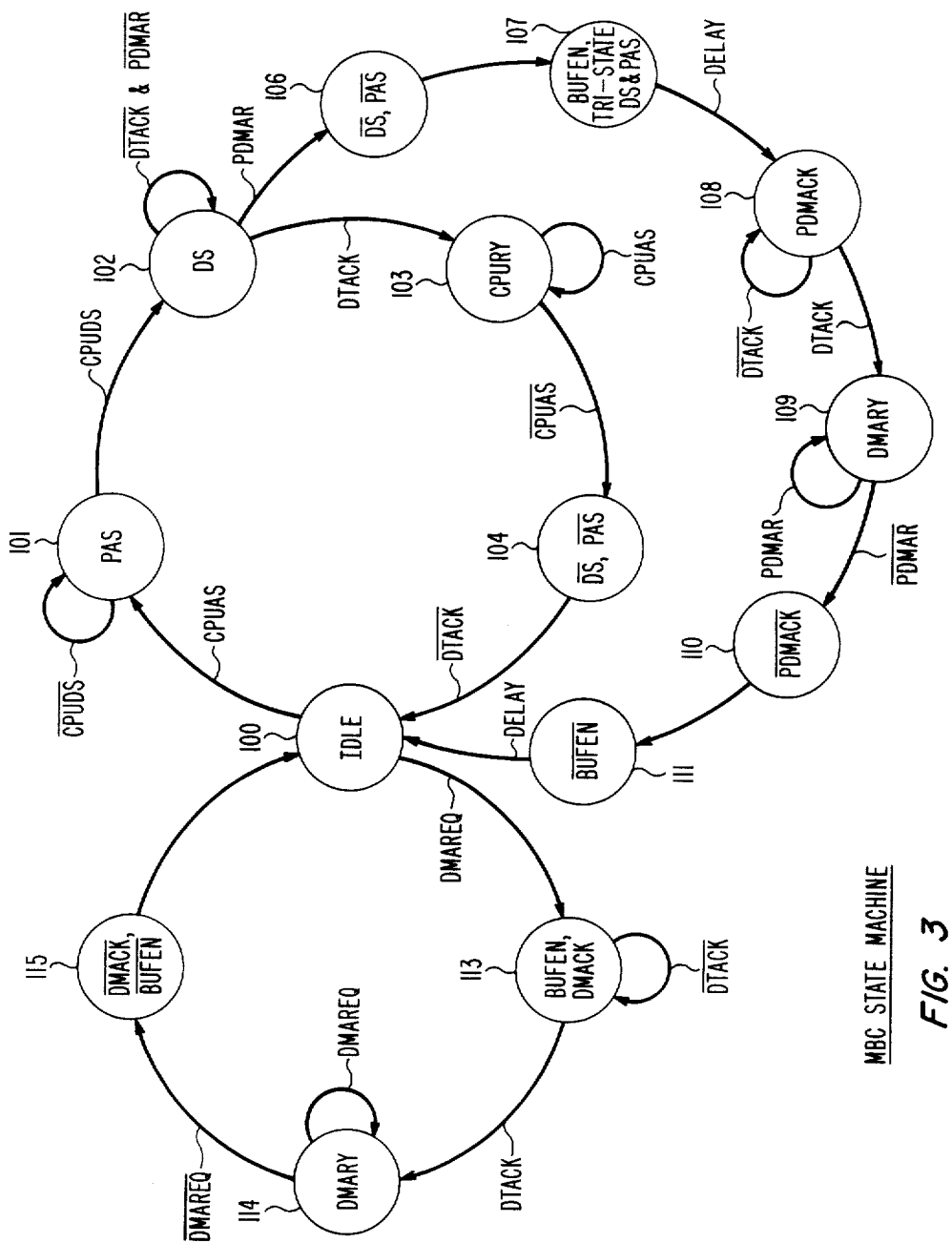
FIG. 3  MBC STATE MACHINE

LB MASTER STATE MACHINE

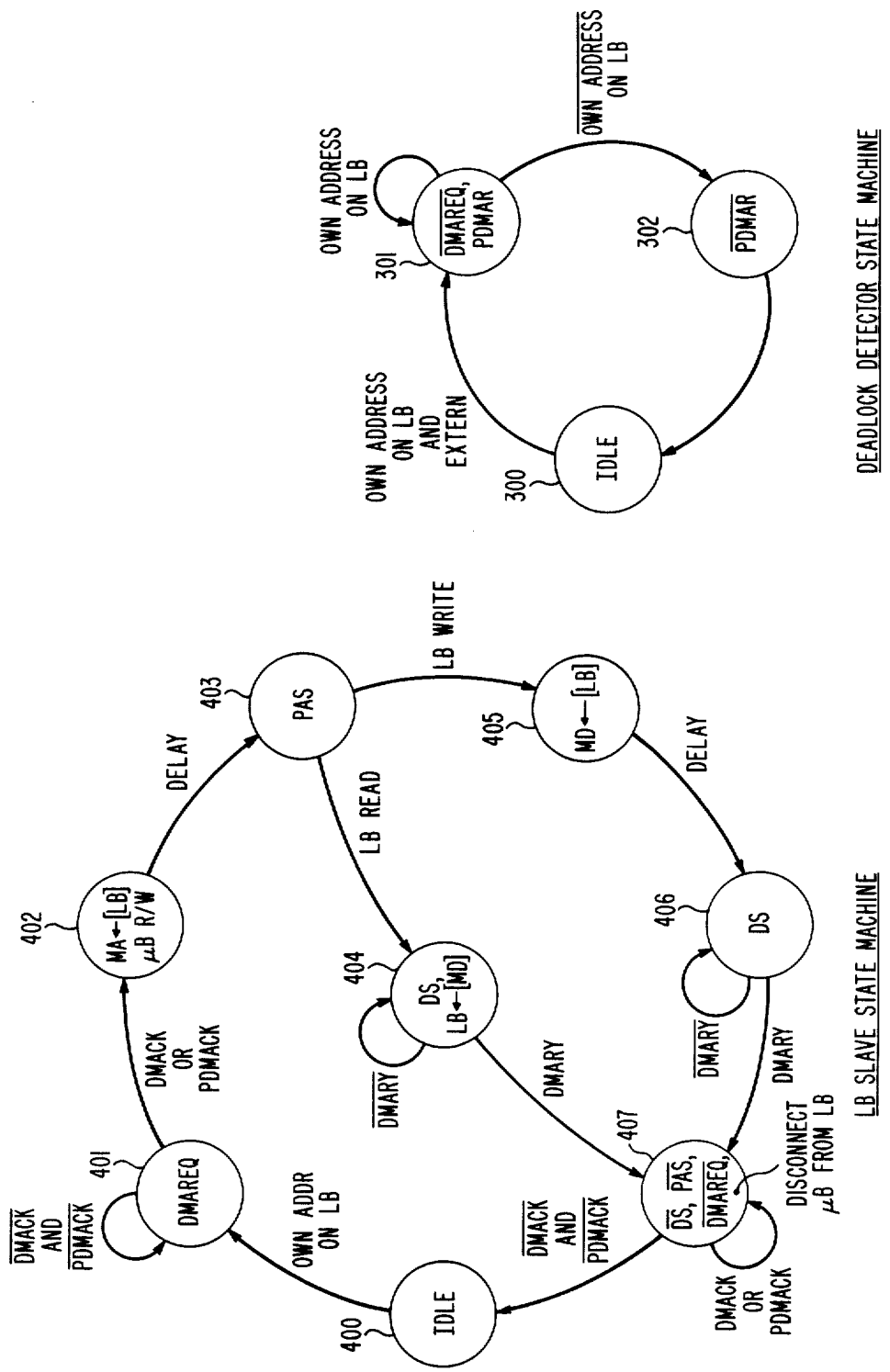

DEADLOCK DETECTION AND RESOLUTION SCHEME

CROSS-REFERENCE TO RELATED APPLICATIONS

Concurrently filed herewith and assigned to the same assignee as this application is:
application of D. J. Brahm, J. M. Grinn, E. L. Hepler, and E. P. Schan, Jr., entitled "Multiprocessor Computing System Featuring Shared Global Control".

TECHNICAL FIELD

This invention relates generally to multipoint communication systems, and particularly to the detection and resolution of deadlock in such systems.

BACKGROUND OF THE INVENTION

Deadlock is a condition characterized by two or more things waiting for related events which cannot happen. For example, it may be the condition wherein a first device occupying a first resource waits to use a second resource which is held by a second device that is waiting to use the first resource. Because neither device can proceed at this point, they are both brought to a permanent standstill. Hence it is necessary to provide either means for preventing a deadlock condition from occurring, or means of detecting and resolving the deadlock condition when it does occur.

The occurrence of a deadlock is a condition faced in multipoint data communication systems, wherein a plurality of stations, such as data links, processors, input and output devices, and storage devices, are interconnected for communication by a communication medium. In such systems it may come to pass that one station attempts to access a second station via the communication medium while the second station is attempting to access the medium. The first station cannot access the second station because the second station is busy attempting to access the medium, but the second station cannot access the medium because the medium is being used by the first station. Hence a deadlock occurs.

The prior art has attempted to solve this problem in various ways. One approach has been to prevent the possibility of occurrence of deadlock by not allowing the stations in the communication system to access each other directly, rather forcing them to communicate through some passive intermediary, such as a buffer storage area; the stations can access the buffer over the communication medium but the buffer itself is passive and not capable of accessing the medium. This approach suffers from the disadvantage that additional buffer storage circuitry must be provided in the communication system, and that the stations must be provided with the additional, often complex or time consuming capability of checking the buffer storage for the presence of communications and of selecting from those communications the ones intended for this station.

Another approach of the prior art to avoiding the occurrence of deadlock has been to allow a station to access another station only after testing the availability of all resources involved in such an access, to make sure that the access can be completed. One disadvantage of this approach is that the stations must be provided with a capability of locking to themselves the needed resources, so that a resource cannot become occupied by a second station during the time between having been checked for availability and actually being used by a first station. Not only are such mechanisms generally complex and expensive to implement, but the whole procedure of testing and locking resources before using them is very time consuming, forces other stations to wait for locked yet unused resources, and hence degrades system performance.

A third approach of the prior art to solving the deadlock problem has been to detect the occurrence of deadlock, and in response to force one of the deadlocked stations to abandon its intended course of action, backing off to give the other station priority in completing its activities. Once the priority station completes its activities, the other station starts out once more on its attempt to carry out the previously abandoned activity. This approach is wasteful because it requires one of the stations to later repeat activities which it has once already performed but which it has been forced to abandon. If the station is under program control, the abandonment of and reattempt at activities generally cannot be made transparent to the software. Rather, program execution must be interrupted, control must be transferred to special software that causes the station to abandon its activity, and control must be provided to reexecute that portion of the program which resulted in the abandoned activity. Furthermore, the one station being given priority is forced to wait while the other station carries out the abandonment and resetting of its activity. System performance is thus degraded, especially in program-controlled environments.

SUMMARY OF THE INVENTION

The present invention is directed to solving the above-described and other disadvantages of the prior art schemes of dealing with the deadlock condition.

According to this invention, a scheme of deadlock detection and resolution in a communication system which includes a communication medium and a first and a second station adapted to access the medium involves detecting access, or attempt at access, by the first station of the second station while the second station is accessing, or attempting to access, the medium, pausing the access, or attempt at access, by the second station to enable the first station to access the second station, and continuing the access, or attempt at access, by the second station when the first station ceases to access the second station.

Preferably, the second station includes a second communication medium interfaced with the above-mentioned, first, medium and adapted for access by the first station, and a device connected to the second medium and adapted to access the first medium via the second medium. Then detection preferably involves monitoring the first and second medium to detect an attempt by the first station to access the second medium while the device is attempting to access the first medium, and pausing and continuing preferably involves disconnecting the device from the second medium and reconnecting the device to the second medium, respectively.

The invention allows stations to access each other and hence it does not impose artificial restraints, along with their related complications, on inter-station communications. As deadlock conditions are allowed to occur, system performance is not degraded by the use of schemes for testing for the possibility of occurrence of deadlock and for deadlock avoidance. Because the invention merely pauses, and later continues, the activity attempted by a station, as opposed to abandoning and later reattempting such activity, the invention avoids the waste incurred by prior art deadlock resolution schemes. And furthermore, the inventive scheme of deadlock detection and resolution can be made transparent to the software of program controlled stations, thus avoiding the degradation of system performance experienced by the prior art schemes.

These and other advantages of the present invention will become apparent from the following description of an illustrative embodiment of the invention, taken together with the drawing.

BRIEF DESCRIPTION OF THE DRAWING

FIG. 3 is a state diagram of the micro bus controller of FIG. 1;

FIG. 5 is a state diagram of the local bus slave of FIG. 1; and

FIG. 6 is a state diagram of the deadlock detector of FIG. 1.

DETAILED DESCRIPTION

System

Figure 1:
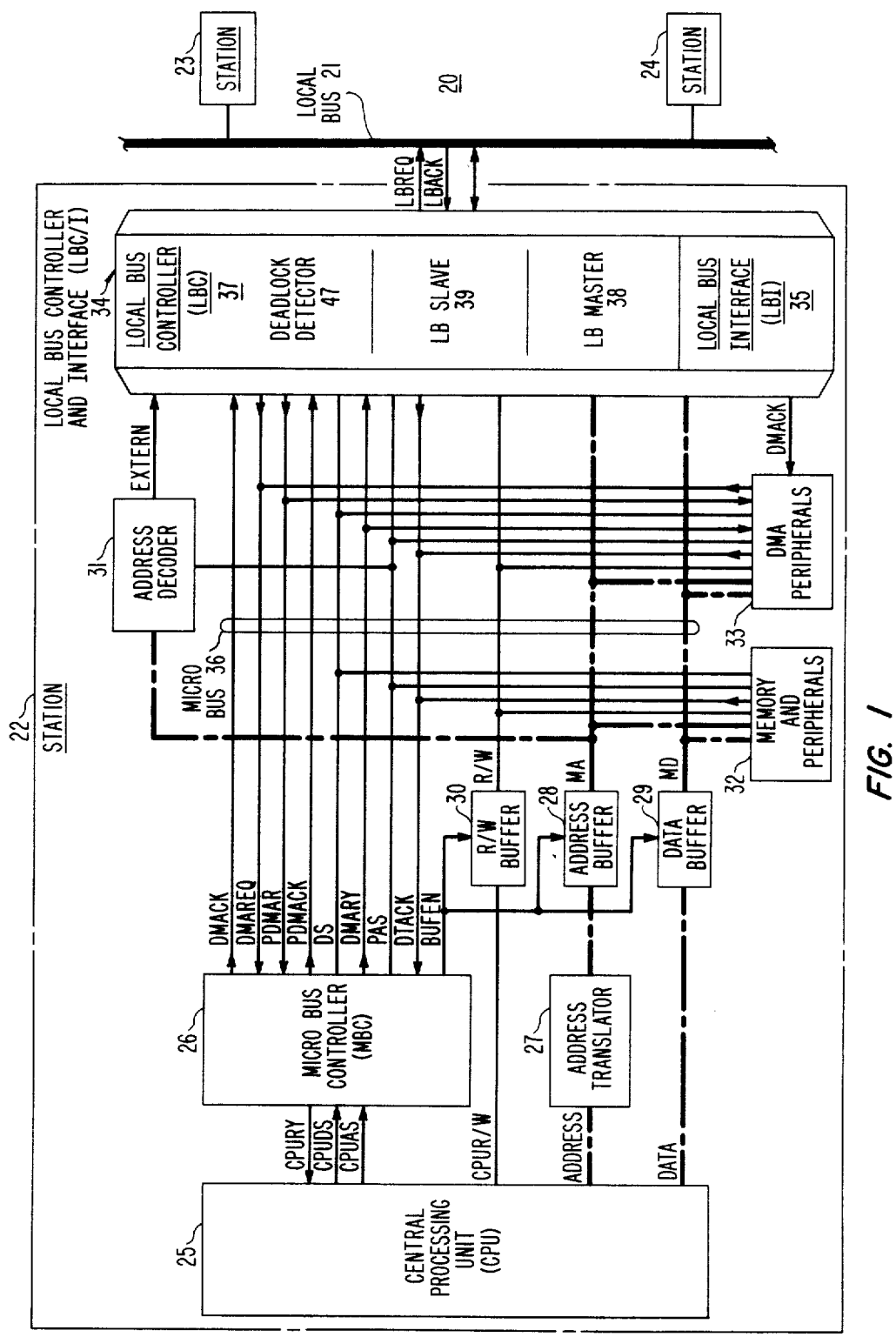
FIG. 1 is a block diagram of a system which embodies an illustrative example of the present invention.

Turning now to the drawing, FIG. 1 shows a portion of a multiprocessor computer system 20. The system 20 comprises a plurality of microprocessor stations, of which three stations 22-24 are shown in the Figure. Henceforth reference to stations 22-24 will be understood to refer to all stations in the system 20. The microprocessor stations 22-24 of the system 20 cooperate with each other in carrying out system tasks. For this purpose the stations 22-24 are interconnected by a local bus (LB) 21, which serves as a communication medium for the stations 22-24. The communication network formed by the stations 22-24 and the local bus 21 allows any station 22-24 within the system 20 to communicate with any other station 22-24.

The local bus 21 may be any suitable communication medium. In the example of FIG. 1, the local bus 21 is adapted for exclusive access by one station 22-24 at any one time. Exclusive access is assured through a bus arbitration scheme. A station 22-24 wishing to access the local bus 21 asserts an LBREQ (local bus request) line leading to a bus arbiter (not shown). The arbiter selects one requesting station 22-24 for access to the bus and signals a grant of access to that station 22-24 by asserting an LBACK (local bus acknowledge) line.

The stations 22-24 are similar to each other in terms of organization and operation. Representative of the stations 22-24 is the station 22, which is diagramed in block form in FIG. 1. The station 22 is comprised of a central processing unit (CPU) 25, memory and peripherals 32, and direct memory access (DMA) peripherals 33, which devices are interconnected for communication by a microbus ($\mu$B) 36. The CPU 25 performs logic and arithmetic operations of the station 22. The memory and peripherals 32 comprise one or more storage units and input/output units. The units of the memory and peripherals 32 are passive resources, in that they may be accessed by other devices, such as the CPU 25, over the microbus 36, but are themselves not capable of accessing other devices over the microbus 36. Resources such as input/output units having the capability of accessing other devices such as the memory and peripherals 32 are included in the DMA peripherals 33.

The CPU 25 is interfaced to the microbus 36 by a microbus controller (MBC) 26 and by an address buffer 28, a data buffer 29, and a read and write (R/W) buffer 30. The MBC 26 monitors the status of the station 22 and coordinates the use of the microbus 36. The MBC 26 controls the buffers 28-30 and through them can selectively disconnect the CPU 25 from the microbus 36.

The MBC 26 is a finite state machine which is defined by the state diagram of FIG. 3. Finite state machines are well known in the art and may be implemented in a variety of ways. For example, a finite state machine may be implemented by an appropriately programmed microprocessor or programmable logic array. The details of implementation are a function of the available technology and are well within the skill of those knowledgeable in the art. For the sake of brevity, the details of finite state machine implementation are not shown or described for this illustrative embodiment. However, finite state machines are customarily defined in terms of the sequence of states of the machine and operations to be executed in each state. FIG. 3 represents such a state diagram of the MBC 26. It shows the states and state transitions and indicates, by means of notation, certain functions executed by the MBC 26. The state diagram and functions of the MBC 26 are described in detail further below.

The microbus 36, and hence the station 22, is interfaced for communication with the local bus 21 by a local bus controller and interface (LBC/I) 34. The LBC/I 34 requests use of the local bus 21 on behalf of the CPU 25 and the DMA peripherals 33 of the station 22 when these devices wish to access another station 23-24 of the system 20. Likewise the LBC/I 34 provides for access of the microbus 36 by stations 23-24 wishing to communicate with devices of the station 22, such as the memory and peripherals 32 or the DMA peripherals 33. Additionally, the LBC/I 34 coordinates and interfaces the communications passing between the local bus 21 and the microbus 36.

The LBC/I 34 includes a local bus interface (LBI) 35, which is responsible for interfacing address and data portions of the microbus 36 and the local bus 21. The LBI 35 is comprised of the necessary buffers, gates, drivers, and logic to accomplish this purpose. Its construction is a function of the structure and organization of the local bus, and lies within the scope of knowledge of the art. The LBC/I 34 also includes a local bus controller (LBC) 37, which is responsible for interfacing control portions of the microbus 36 and the local bus 21. The LBC 37 is comprised of an LB master 38 which controls communications on the local bus 21 initiated by the station 22, an LB slave 39 which controls communications on the microbus 36 initiated by other stations 23-24 across the local bus 21, and a deadlock detector 47 which detects and signals the occurrences of a deadlock condition. Like the MBC 26, the LB master 38, the LB slave 39, and the deadlock detector 47 are finite state machines, and they are defined by the state diagrams of FIGS. 4-6, respectively. The state diagrams and functions of the units 38, 39, and 47 are described in detail further below.

As was mentioned above, the micro bus 36 serves as the communication link between the various devices of the station 22. The microbus 36 is comprised of an address bus MA (micro address), a data bus MD (micro data), and a plurality of control lines which will be described below. The microbus 36 is a Tri-state mode bidirectional bus: the MA and MD buses and some of the control lines which comprise the microbus 36 are adapted to selectively assume any one of three conditions or signal levels, and signals can travel on those buses and lines in both directions. For purposes of this example the three levels are considered to be the following: a first level in which a signal is considered to be asserted; a second level in which the inverse of the signal is considered to be asserted, or equivalently the signal is considered to be deasserted; and a third neutral level, referred to as the Tri-state level, in which neither the signal nor its inverse is considered to be asserted. Henceforth, a reference to the microbus 36 as being in Tri-state mode is intended to indicate that those buses and control lines of the bus 36 which are capable of assuming the Tri-state mode are placed in the Tri-state level.

Other control lines of the microbus 36 are unidirectional. These lines are adapted to selectively assume either an asserted or a deasserted condition or signal level, and signals are allowed to pass on these lines in one direction only. When the microbus 36 is in the tri-state mode, these lines are deasserted.

Considering now the routing of the microbus 36 in the station 22, the bidirectional Tri-state mode MD bus is connected to data ports of the LBC/I 34, the DMA peripherals 33, the memory and peripherals 32, and the data buffer 29. A DATA bus interconnecting a second port of the data buffer 29 with a data port of the CPU 25 serves to connect the CPU 25 to the MD bus.

The bidirectional Tri-state mode MA bus is similarly connected to address ports of the LBC/I 34, the DMA peripherals 33, the memory and peripherals 32, and the address buffer 28. A second port of the address buffer 28 is connected to a physical address port of an address translator 27, whose virtual address port is connected by an ADDRESS bus to an address port of the CPU 25. The ADDRESS bus thus serves to connect the CPU 25 with the MA bus. The address translator 27 is a device which translates virtual addresses used by the CPU 25 into physical addresses used by the rest of the station 22. Such devices are well known in the art.

The MA bus is also connected to an input port of an address decoder 31, whose output is connected to an input of the LBC/I 34 by a unidirectional bi-state EXTERN line. The decoder 31 monitors the addresses on the MA bus and signals the LBC/I 34 via the EXTERN line when it detects a local bus 21 address thereon, i.e., an off-station 22 address which requires the microbus 36 to be interfaced to the local bus 21. Such decoders are also known in the art.

A bidirectional Tri-state mode R/W (read and write) line interconnects the memory and peripherals 32, the DMA peripherals 33, the LBC/I 34, and the R/W buffer 30. Connection between the CPU 25 and the buffer 30 is made by a CPUR/W line, which thus serves to connect the CPU 25 to the R/W line. The state of the line R/W indicates whether a "read" or a "write" operation is being performed over the microbus 36.

A unidirectional bi-state control line DTACK, and bidirectional Tri-state mode control lines PAS and DS interconnect the memory and peripherals 32, the DMA peripherals 33, the LBC/I 34, and the MBC 26. The line PAS additionally connects to an input of the address decoder 31. Unidirectional bi-state lines DMARY, DMAREQ, and PDMAR interconnect the DMA peripherals 33, the LBC/I 34, and the MBC 26. Unidirectional bi-state line DMACK leads from the MBC 26 through the LBC/I 34 to the DMA peripherals 33. Unidirectional bi-state line PDMACK provides a connection between the LBC/I 34 and the MBC 26, and unidirectional bi-state control lines CPURY, CPUDS, and CPUAS connect the MBC 26 with the CPU 25. The function of these lines is explained below.

Protocol

Any device other than the CPU 25 wishing to gain control of the microbus 36 for purposes of communication, referred to as a bus master, must first request the bus 36 by asserting the DMAREQ line and be granted use of the bus 36 by the CPU 25 by assertion of the DMACK line. The CPU 25 is a "default" bus master in that it is the master of the bus 36 at all times when another device is not the bus master and hence the CPU 25 need not request use of the bus 36.

Figure 2A:
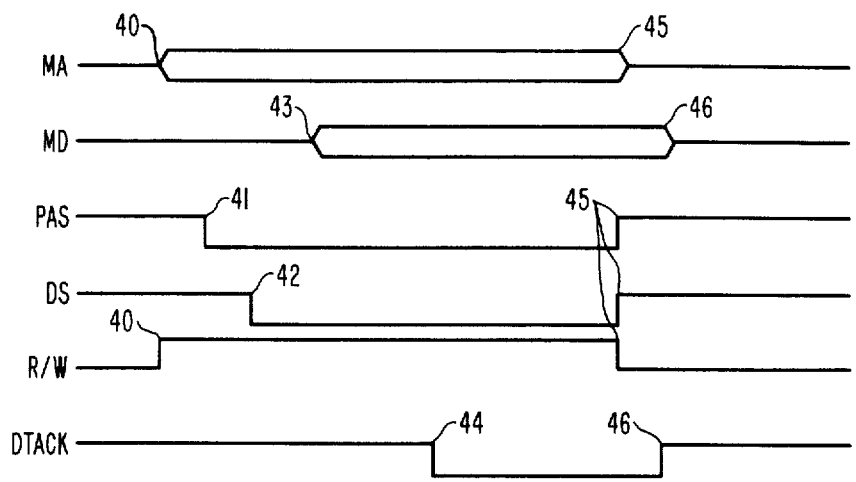
FIGS. 2A-B are timing diagrams of the basic "read" and "write" protocol, respectively, of the microbus of FIG. 1.
Figure 2B:
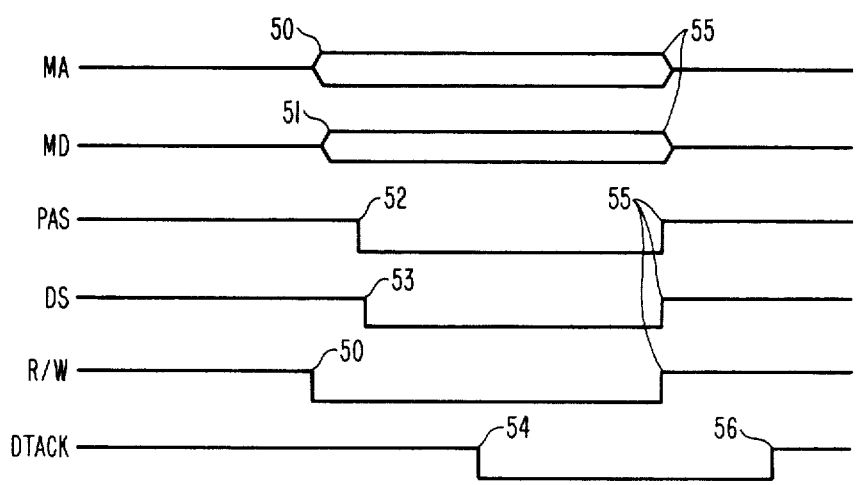

The basic communication protocol of the microbus 36 is defined by the timing diagrams of FIGS. 2A-B. FIG. 2A shows the protocol of a "read" operation. Initially the microbus 36 is assumed to be in the Tri-state mode. A microbus master, that wishes to perform a "read" operation on a second device, referred to as a microbus slave, outputs the address of the slave onto the MA bus at time 40. Substantially at the same time 40 the master asserts high the R/W line to signal the devices that this is a "read" operation.

Following a delay to allow the state of the MA bus to settle, the master asserts at time 41 the PAS (physical address strobe) line to signal devices connected to the microbus 36 that an address is present on the MA bus. Each device monitors the address on the MA bus to determine if it is being addressed. Thereafter at time 42 the master asserts the DS (data strobe) line to signal the devices that it is ready to accept data. The slave, i.e., the device which recognized its address on the MA bus, responds to the "read" and DS signals by outputting the requested data onto the MD bus at time 43. Following a delay to allow the state of the data on the MD bus to settle, the slave asserts at time 44 the DTACK (data acknowledge) line to signal the master that it can go ahead and take the data from the MD bus. At time 45, when the master is done reading the data from the MD bus, it deasserts the MA bus and the PAS, DS and R/W lines, thus acknowledging the receipt of the data. When the slave senses the loss of the PAS signal, it responds at time 46 by deasserting the MD bus and the DTACK line. The microbus 36 then resumes the Tri-state condition.

FIG. 2B shows the protocol of a "write" operation, which is substantially similar to the protocol of the "read" operation. The microbus 36 is again initially assumed to be in the Tri-state mode. A master wishing to perform a "write" operation on a slave outputs the address of the slave onto the MA bus at time 50. Substantially at the same time 50 the master asserts low the R/W line to signal the slave that this is a "write" operation. The master also outputs the data to be written onto the MD bus at time 51. The time 51 may be earlier, later, or the same as time 50.

Following a delay after time 50 that allows the address values on the MA bus to settle, the master asserts the PAS line at time 52 to signal devices connected to the microbus 36 that an address is present on the MA bus. Each device again monitors the address to determine if it is being designated the slave. Following a delay after time 51 that allows the data values on the MD bus to settle, at time 53 the master asserts the DS line to signal that data from the MD bus may be accepted by the slave. The slave responds to the "write" and DS signals by taking the data from the MD bus and asserting at time 54 the DTACK line to acknowledge the receipt of the data. The master responds to the DTACK signal at time 55 by deasserting the MA and MD buses and the PAS, DA, and R/W lines. When the slave senses the loss of the PAS signal, it responds at time 56 by deasserting the DTACK line. The microbus 36 then resumes the tri-state condition.

While the present example assumes a single DS line, alternatively the microbus 36 may include a DS bus comprised of a plurality of lines, wherein the DS signals specify to the slave the size of the data that is being read or written, for example a byte, a half-word, or a word. For purposes of this example, a byte comprises 8 bits, a half-word comprises 16 bits, and a word comprises 32 bits. Furthermore, the DS bus may carry separate DS signals for "read" and "write" operations, in which case the separate R/W line may be eliminated.

Deadlock can occur in the system 20 when one station 22-24 attempts to access the local bus 21 while another station 22-24 has control of the local bus 21 and is trying to access the one station 22-24. Referring to FIG. 1, deadlock occurs at the station 22 when the CPU 25 or one of the DMA peripherals 33 has control of the microbus 36 and is trying to access the local bus 21 through the LBC/I 34 for the purpose of communicating with a station 23-24, while a station 23-24 has control of the local bus 21 and is trying to access the microbus 36 through the LBC/I 34 for the purpose of communicating with the memory and peripherals 32 or the DMA peripherals 33.

In these contemporaneous access situations deadlock is detected and signaled by the deadlock detector 47, and priority of access is resolved by the station 22 in favor of the local bus 21-to-station 22 communication. The CPU 25 is disconnected from the micro bus 36, thus pausing its attempted communication, and the DMA peripherals 33 are forced to abandon their attempted communication, if any is occurring. The microbus 36 thus becomes freed for access from the local bus 21. When the access from the local bus 21 is completed, the DMA peripherals 33 may reattempt their planned communication, but the CPU 25 is simply reconnected to the microbus 36 to continue with its attempted communication from the point at which it was interrupted.

Communications

Signaling involved in communications between the various devices of the station 22, and between the station 22 and the local bus 21, will now be considered, with reference to the state diagrams of FIGS. 3-6, to illustrate in greater detail the detection and resolution of deadlock in the system 20.

Turning first to the state diagram of the MBC 26, shown in FIG. 3, when communications between devices are not proceeding on the microbus 36, the MBC lies idle in IDLE state 100. In IDLE state, the MBC 26 and likewise other state machines of the system 20 place their outputs capable of assuming the Tri-state level in the Tri-state level and deassert their bi-state outputs. In the IDLE state 100, priority of mastership of the microbus 36 is given by the MBC 26 to the CPU 25. Since the BUFEN (buffer enable) line is not asserted in the IDLE state 100, the CPU 25 is connected to the microbus 36 via the buffers 28-30 (see FIG. 1). To initiate communications, the CPU 25 merely starts communicating, while the devices 32-34 must first request use of the microbus 36 by asserting the DMAREQ (direct memory access request) line and then await grant of use of the microbus 36 via signals on the DMACK (direct memory access acknowledge) line. This explanation is expanded upon below.

Considering first communications of the CPU 25, to initiate communications the CPU 25 outputs on the ADDRESS bus the virtual address of the desired slave, outputs a "read" or a "write" signal on the CPUR/W (central processing unit read and write) line, and asserts the CPUAS (central processing unit address strobe) line to the MBC 26.

The address translator 27 translates the virtual address output by the CPU 25 into a physical address and outputs it to the MA bus via the address buffer 28. The signal on the CPUR/W line passes through the R/W buffer 30 onto the R/W (read and write) line and to the devices 32-34.

Referring to FIG. 3, the MBC 26 responds to the CPUAS signal by waiting a sufficient time to allow the address translator 27 to complete the address translation and for the physical address values to become settled on the MA bus, and then goes to state 101. In the state 101 the MBC 26 asserts the PAS (physical address strobe) line and waits for the assertion of the CPUDS (central processing unit data strobe) line by the CPU 25.

Since the MBC 26 has left the idle state 100 and therefore stopped monitoring the DMAREQ line when the CPU 25 asserted the CPUAS line, subsequent requests for use of the microbus 36 by the devices 32-34 are held in abeyance until the CPU 25 leaves the microbus 36 and the MBC 26 returns to the idle state 100. The exception to this rule is deadlock resolution, discussed further below.

The address on the MA bus and the PAS signal pass to the memory and peripherals 32, the DMA peripherals 33, and the address decoder 31. The devices 32 and 33 examine the address to determine whether they are the slave, i.e., whether they are being addressed. The address decoder 31 examines the address to determine if it is an off-station 22 address. If it is an off-station 22 address, the decoder 31 asserts the EXTERN (external) line to the LBC/I 34 to advise it that interfacing of the microbus 36 to the local bus 21 will be required.

In the case of a "read" operation, the CPU 25 asserts the CPUDS line when it is ready to receive data. In the case of a "write" operation, the CPU 25 outputs data onto the DATA bus and asserts the CPUDS line. The data, if any, pass through the data buffer 29 onto the MD bus and to the devices 32-34.

The MBC 26 responds to the CPUDS signal by going to the state 102 in which it asserts the DS (data strobe) line and awaits the assertion of the DTACK (data acknowledge) or PDMAR (preemptive direct memory access) lines, as shown in FIG. 3. If one of the devices 32-33 and not the LBC/I 34 is chosen as the slave, deadlock cannot occur and therefore the MBC 26 will not receive a PDMAR signal.

Asssuming that one of the devices 32-33 is indeed selected as the slave, it responds to the DS signal and to the signal on the R/W line either by taking data off the MD bus in the case of a "write" operation, or by putting data on the MD bus in the case of a "read" operation, and by asserting the DTACK line. The data, if any, pass over the MD bus through the data buffer 29 and over the DATA bus to the CPU 25. The DTACK signal is detected by the MBC 26, which responds by going to the state 103 and asserting the CPURY (central processing unit reply) line to the CPU 25. The MBC 26 then waits for the CPU 25 to deassert the CPUAS line.

Having been informed by the CPURY signal that the device 32-33 received the data, in the case of a "write" operation, the CPU 25 deasserts the CPUAS line and the CPUDS line and places the MA and MD buses and the R/W line in the Tri-state level by deasserting the ADDRESS and DATA buses and the CPUR/W line. Having been informed by the CPURY signal that data is ready on the DATA bus and having taken the data off of the DATA bus, in the case of a "read" operation, the CPU 25 deasserts the CPUAS line and the CPUDS line and places the MA bus and the R/W line in the Tri-state level by deasserting the ADDRESS bus and the CPUR/W line. In either case the MBC 26 responds to the loss of the CPUAS signal by going to state 104 in which state it deasserts the PAS and DS lines. The slave device 32-33 responds to the loss of the PAS signal by deasserting the DTACK line, and by placing the MD bus in the Tri-state level in the case of a "read" operation.

The MBC 26 responds to the deassertion of the DTACK line by returning to the IDLE state 100, in which it places the PAS and DS lines in the Tri-state level. The communication from the CPU 25 to the devices 32-33 is thus completed.

Figure 4:
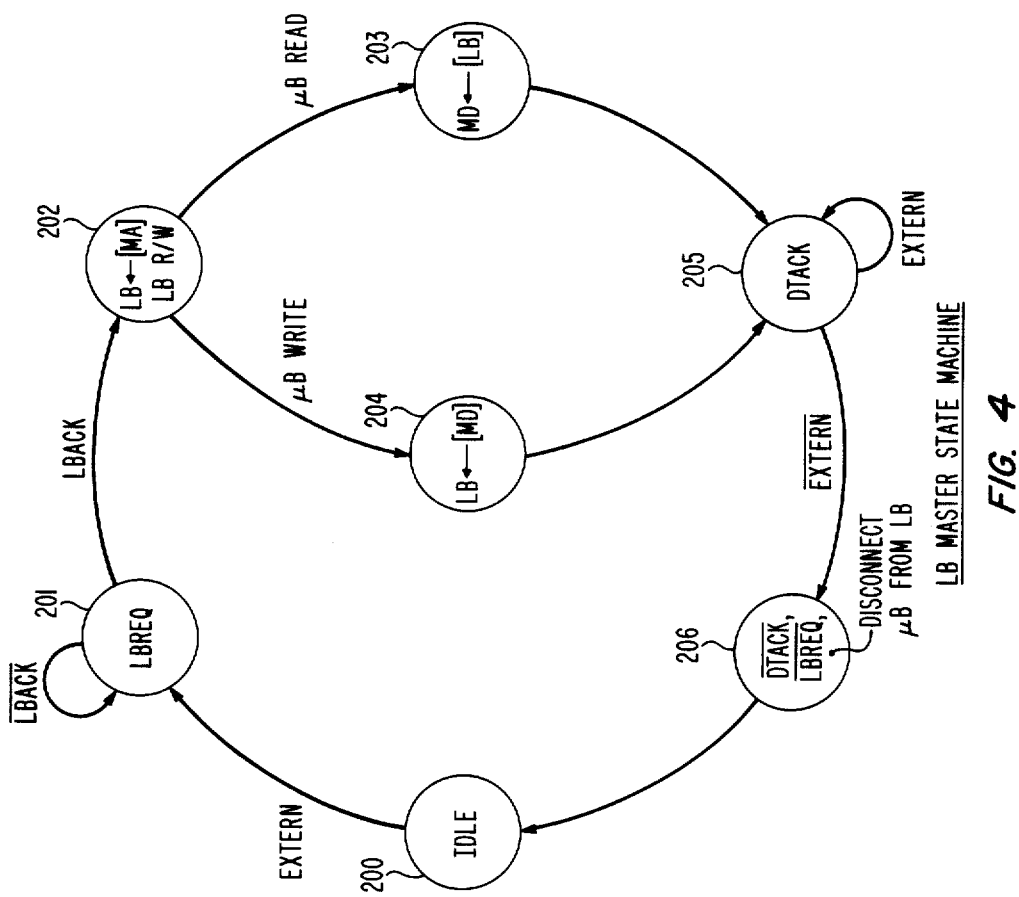
FIG. 4 is a state diagram of the local bus master of FIG. 1.

Considering instead the situation where the LBC/I 34 is selected by the CPU 25 as the slave, the LBC/I 34 will have been informed of this selection by the address decoder's 31 assertion of the EXTERN line, as was explained above. Because an off-station 22 access is indicated, the LB master 38 responds to the EXTERN signal by leaving its IDLE state 200 and going to state 201, as shown in FIG. 4, in which state it asserts its LBREQ (local bus request) line to request use of the local bus 21, and awaits the receipt of the LBACK (local bus acknowledge) signal that will grant it the requested use of the local bus 21.

Meanwhile, as shown in FIG. 6, the deadlock detector 47 is in its IDLE state 300, monitoring the local bus 21 to determine if the station 22 is being addressed over the local bus 21. The presence of the address of the station 22 indicates that the station 22 is being accessed over the local bus 21. Should this occur while the EXTERN lead is asserted, that is, while the station 22 is attempting to access the local bus 21, deadlock results and is detected by the deadlock detector 47. Deadlock may occur at any time until the LB master 38 receives the LBACK signal. Upon the receipt of that signal, the station 22 becomes the master of the local bus 21, and therefore deadlock cannot occur at the station 22. Deadlock can then occur only at the station 23-24 which is being accessed over the local bus 21 by the station 22.

Assuming that deadlock is not detected by the deadlock detector 47, the detector 47 remains in its IDLE state 300. Referring to FIG. 4, upon receipt of the LBACK signal, the LB master 38 goes to state 202 in which it causes, along with the LBI 35, the MA to become interfaced to the local bus 21 and the address present on the MA to be transferred onto the local bus 21. The details of implementing the circuitry to accomplish this operation are a function of the structure and protocol of the local bus 21 and are within the scope of knowledge of the art.

At this time the LB master 38 also checks the state of the R/W line of the micro bus 36 to determine if a "read" or a "write" operation is being performed. If the operation is a "read", the LB master 38 goes to state 203. In the state 203 the LB master 38 indicates a "read" to the local bus 21 and causes, along with the LBI 35, the MD bus to become interfaced to the local bus 21 such that data present on the local bus 21 are transferred to the MD bus. However, if the operation is a "write", the LB master 38 goes to state 204. In the state 204 the LB master 38 indicates a "write" to the local bus 21 and causes, along with the LBI 35, the MDS bus to become interfaced to the local bus 21 such that data present on the MD bus are transferred to the local bus 21. Once again, the details of implementing the circuitry to accomplish these operations are a function of the structure and protocol of the local bus 21 and are within the scope of knowledge of the art.

Upon completion of the interface of the local bus 21 with the MD bus and the transfer of data between them, the LB master 38 goes from either state 203 or state 204 to state 205, in which it asserts the DTACK line to the MBC 26 and waits for removal of the EXTERN signal.

The MBC 26 and the CPU 25 respond to the DTACK signal from the LBC/I 34 in the same manner as they responded to the DTACK signal from the devices 32-33, as shown in FIG. 3 and described above. When the MBC 26 deasserts the PAS line in state 104, the address decoder 31 responds by deasserting the EXTERN line.

The loss of the EXTERN signal causes the LB master 38 to change to state 206 (see FIG. 4) in which it deasserts the DTACK line, and also deasserts the LBREQ line and disconnects the microbus 36 from the local bus 21, thus freeing both buses. The LB master 38 then returns to its IDLE state 200.

The MBC 26 responds to the loss of the DTACK signal as before (see FIG. 3), returning to its IDLE state 100 to tri-state the PAS and the DS lines.

Because the deadlock condition is handled by the station 22 is much the same way as access to the station 22 from the local bus 21 without deadlock, the latter situation is described next.

When the station 22 is being accessed over the local bus 21, for example by one of the other stations 23-24, the station 22 is informed of this condition by the appearance of its address on the local bus 21. Because deadlock is assumed to not be occcurring, the EXTERN line is not asserted and hence the deadlock detector 47 remains in its idle state 300 (see FIG. 6). Turning to FIG. 5, when the LB slave 39 detects the address of the station 22 on the local bus 21, it leaves its IDLE state 400 and goes to state 401 in which it asserts the DMAREQ (direct memory access request) line and waits for a DMACK (direct memory access acknowledge) or a PDMACK (preemptive direct memory access acknowledge) signal.

As shown in FIG. 3 and described above, the MBC 26 represents to the DMAREQ line only when it is in the IDLE state 100. If the CPU 25 is communicating with the devices 32-33 and hence the MBC 26 is not in the IDLE state 100, the LB slave 39 must wait for the CPU 25 to finish its communications and for the MBC 26 to return to the IDLE state 100.

When the MBC 26 is in the IDLE state 100, it responds to the assertion of the DMAREQ line by going to the state 113, in which it asserts the BUFEN line. This causes the buffers 28-30 to become disabled, thus disconnecting the CPU 25 from the microbus 36. In the state 113, the MBC 26 also becomes nonresponsive to the assertions of the CPUAS and CPUDS lines by the CPU 25. However, the CPU 25 is not aware of having been disconnected from the microbus 36. The disconnection is transparent to the program under whose control the CPU 25 is operating. Hence, if the CPU 25 wishes to initiate communications while disconnected from the microbus 36, it may do so. But the communications will be blocked by the disabled buffers 28-30 and by the MBC 26. Thus, the CPU 25 will not receive a CPURY signal, and it will sit idle, paused in its communications, until the MBC 26 reconnects it to the microbus 36 and allows its communications to continue.

Having disconnected the CPU 25 from the micro bus 36, the MBC 26 also asserts the DMACk line in the state 113, and then awaits the assertion of the DTACK line.

Returning to FIG. 5, the LB slave 39 responds to the assertion of the DMACK line by moving to state 402, in which it causes, along with the LBI 35, the local bus 21 to become interfaced to the MA bus, and the upper bits of the address from the local bus 21 to be transferred to the MA bus. Lower bits of the address which designate the station 22-24 which is being addressed are stripped off and are not transferred to the MA bus. Once again, details of the implementation of the circuitry to accomplish these operations, and the below-described interfacing of the local bus 21 to the MD bus, are a function of the structure and protocol of the local bus 21 and lie within the scope of knowledge of the art.

At this time, the LB slave 39 also examines the signals on the local bus 21 to determine whether a "read" or a "write" operation is indicated, and outputs the appropriate signal onto the R/W line.

Following a delay to allow the address signals to become settled on the MA bus, the LB slave 39 goes to the state 403 in which it asserts the PAS line, causing the devices 32-33 to examine the address on the MA bus to determine which one of them is being designated the microbus slave in this operation.

If a "read" operation is indicated, the LB slave 39 goes to state 404 in which is causes, along with the LBI 35, the local bus 21 to become interfaced to the MD bus for transfer of data from the MD bus onto the local bus 21. In the state 404, the LB slave 39 also asserts the DS line. It then awaits assertion of the DMARY (direct memory access reply) line.

If a "write" operation is indicated, the LB slave 39 goes from the state 403 to state 405 in which it causes, along with the LBI 35, the local bus 21 to become interfaced to the MD bus and data to become transferred from the local bus 21 onto the MD bus. Following a delay to allow the data signals on the MD bus to settle, the LB slave 39 goes to state 406 in which is asserts the DS line. It then awaits assertion of the DMARY line.

The device 32-33 which has been selected as the microbus slave responds to the DS and R/W line signals by reading data onto the MD bus or writing data from the MD bus, depending on whether a "read" or a "write" operation, respectively, is indicated, and by asserting the DTACK line to signal completion of its part of the operation.

Referring to FIG. 3, the MBC 26 reponds to the DTACK signal by going to state 114 and asserting the DMARY line. It then waits for the deassertion of the DMAREQ line.

Returning now to FIG. 5, the LB slave 39 responds to the assertion of the DMARY line by leaving the state 404 or the state 406 and going to state 407, in which it disconnects the local bus 21 from the microbus 36 and deasserts the DS, the PAS, and the DMAREQ lines.

Referring again to FIG. 3, the MBC 26 responds to the deassertion of the DMAREQ line by going to state 115 in which it deasserts the DMACK line, and also deasserts the BUFEN line, to again enable the buffers 28-30 and thus to reconnect the CPU 25 to the microbus 36. The MBC 26 then resumes the IDLE state 100, and again becomes rsponsive to the assertions of the CPUAS and CPUDS lines by the CPU 25.

As shown in FIG. 5, the deassertion of the DMACK line causes the LB slave 39 to reassume its IDLE state 400. The local bus 21-to-station 22 transaction is thus completed.

As was mentioned above, deadlock occurs when an attempt is made to access the station 22 from the local bus 21 while the station 22 is attempting to access the local bus 21. Assuming that the CPU 25 is accessing the local bus 21, the access proceeds in the manner that was described above in conjunction with FIGS. 3 and 4, up to the point of assertion of the EXTERN lead. Hence, the MBC 26 is in the state 102, asserting the PAS and DS lines, as shown in FIG. 3, and the LB master 38 is in state 201, asserting the LBREQ line, as shown in FIG. 4. Likewise, the access from the local bus 21 to the station 22 proceeds in the manner described above in conjunction with FIG. 5, to the point where the LB slave 39 is in the state 401, asserting the DMAREQ line, as shown in FIG. 5.

Turning now to FIG. 6, at this point the deadlock detector 47 detects deadlock by sensing the address of the station 22 on the local bus 21 while sensing that the EXTERN line is asserted. The deadlock detector 47 responds to the deadlock condition by going from its IDLE state 300 to the state 301, deasserting the DMAREQ line (which was previously asserted by the LB slave 39), and asserting in its stead the PDMAR (preemptive direct memory access request) line.

The MBC 26 responds to the detection of deadlock by resolving the deadlock: it gives preference to the access of the station 22 from the local bus 21 and pauses, holds in abeyance, the attempt by the station 22 to access the local bus 21.

Referring to FIG. 3, the MBC 26 responds to the assertion of the PDMAR line by going from the state 102 to state 106. In the state 106, the MBC 26 asserts the DS and PAS lines. It then goes to state 107 where it asserts the BUFEN line, thus disconnecting the CPU 25 from the microbus 36 and placing the MA and MB buses and the R/W line in the Tri-state level. In the state 107, the MBC 26 also places the DS and PAS lines in the Tri-state level. Thus the microbus 36 becomes initialized and ready to be interfaced to the local bus 21 to complete the local bus 21-to-station 22 access. Following a delay to allow the state of the microbus 36 to settle, the MBC 26 goes to state 108 and asserts the PDMACK line.

As in the case of the local bus 21-to-station 22 access without deadlock, the CPU 25 is not aware of having been disconnected from the microbus 36. The disconnection is transparent to the program under whose control the CPU 25 is operating. Further progress of the communication of the CPU 25 is paused, and the CPU 25 is merely forced to wait for a CPURY signal longer than usual. The CPU 25 must wait until the local bus 21-to-station 22 access is completed, at which time the CPU 25 is reconnected to the microbus 36 and the paused communication is resumed from the point at which it was paused.

Because the address that had been output by the CPU 25 onto the MA has been removed therefrom by the initialization of the micro bus 36, the address decoder 31 deasserts the EXTERN line. This does not affect the state of the deadlock detector 47 or of the LB master 38 because neither is in its respective IDLE state and hence neither is monitoring the EXTERN line at this time. (See FIGS. 5 and 6). Rather, the deadlock detector 47 continues to monitor the local bus 21 for the presence of the address of the station 22, and the LB master 38 continues to assert the LBREQ line. But because the local bus 21 is occupied, being used in the access of the station 22, the LB master 38 does not receive an LBACK signal until the access of the station 22 is completed.

Turning to FIG. 5, the LB slave 39 responds to the assertion of the PDMACK line in the same manner in which it was previously described to have responded to the assertion of the DMACK line, and executes the "read" or "write" access from the local bus 21 to the station 22.

When the accessed device 32-33, i.e., the microbus slave for this transaction, completes its portion of the transaction, it asserts the DTACK line, causing the MBC 26 to go to state 109 to assert the DMARY line (see FIG. 3). The LB slave 39 again responds to the assertion of the DMARY line by going to state 407, disconnecting the microbus 36 from the local bus 21, and deasserting the DS, PAS, and DMAREQ lines.

Upon completion of the access of the station 22 from the local bus 21, the address of the station 22 is removed from the local bus 21. As shown in FIG. 6, this condition is sensed by the deadlock detector 47, which responds by going to state 302 and deasserting the PDMAR line. The detector 47 then returns to its IDLE state 300.

Deassertion of the PDMAR line causes the MBC 26 to go to state 110 to deassert the PDMACK line, as shown in FIG. 3. The LB slave 39 responds to the loss of the PDMACK signal in the same manner as it responded to the loss of the DMACK signal, by returning to its IDLE state 400 (see FIG. 5). The local bus 21-to-station 22 access is thus fully completed.

Referring again to FIG. 3, following deassertion of the PDMACK line, the MBC 26 goes to state 111 and deasserts the BUFEN line, thus turning on the buffers 28-30 and reconnecting the CPU 25 to the microbus 36. Assuming that the communication of the CPU 25 which was paused by the deadlock condition is still pending, the R/W line and the MA and MD buses take on values corresponding to those being output by the CPU 25, and following a delay allowing the state of those values to settle, the MBC 26 returns to the IDLE state 100. But if, as was assumed, the paused communication of the CPU 25 is still pending, then both lines CPUAS and CPUDS are asserted, and so the MBC 26 immediately passes from the state 100 through the state 101 and to the state 102, asserting the PAS and DS lines. The condition of the microbus 36 is now the same as it was at the time of the detection of the deadlock, and the communication of the CPU 25 resumes at the point where it left off.

Unlike the memory and peripherals 32, the DMA peripherals 33 are also capable of initiating communications in the system 20. When a DMA peripheral 33 wishes to communicate on the microbus 36, for example for the purpose of accessing the memory and peripherals 32 or for the purpose of accessing the local bus 21, it asserts the DMAREQ line. Referring to FIG. 3, the MBC 26 responds to the DMAREQ signal only when it is in the IDLE state 100, as was explained above. The MBC 26 leaves the IDLE state 100 in response to the assertion of the DMAREQ line and goes to state 113, in which it disconnects the CPU 25 from the microbus 36 to free the microbus 36 for use by the DMA peripheral 33. The MBC 26 then asserts the DMACK line.

When the DMA peripheral 33 receives the DMACK signal, it proceeds to communicate on the microbus 36 according to the protocol of FIGS. 2A and 2B. If the address output by the DMA peripheral 33 is an off-station 22 address, the address decoder 31 detects this condition and asserts the EXTERN line.

If a deadlock condition does not result when the EXTERN line is asserted, the LB master 38 interfaces the communications of the DMA peripheral 33 to the local bus 21 in the manner shown in FIG. 4 and described above. In the process, the MBC 26 makes a transition to the state 114, as shown in FIG. 3. When the communication is finished, the DMA peripheral 33 deasserts the DMAREQ line, causing the MBC 26 to go to state 115 in which it deasserts the DMACK line and reconnects the CPU 25 to the microbus 36. The MBC 26 then returns to its IDLE state 100.

If the communication attempted by the DMAR peripheral 33 does result in a deadlock, however, the deadlock detector 47 detects the condition in the manner described above, and goes from the IDLE state 300 to the state 301 where it deasserts the DMAREQ line and asserts the PDMAR line. (See FIG. 6).

As the MBC 26 is in the state 113 (See FIG. 3), it is not monitoring the PDMAR and DMAREQ lines, so it does not respond to the deadlock condition. But a response from the MBC 26 is not required, as the CPU 25 is already disconnected from the microbus 36. However, the DMA peripheral 33 is monitoring the PDMAR line, and when it detects that the PDMAR line has been asserted, it resets itself, canceling its attempt at communication and releasing the microbus 36. The DMA peripheral 33 not only deasserts and places the MD and MA buses and the R/W, the PAS, and DS lines, in the Tri-state level but also deasserts the DMAREQ line. Thus, the DMA peripheral 33 assumes the condition it was in before attempting the communication, and becomes available for access from the local bus 21 should it be selected as the microbus slave.

Because the MBC 26 is in the state 113 (see FIG. 3), it is asserting the DMACK line. Therefore, the local bus 21-to-station 22 communication is enabled to proceed in the manner shown in FIG. 5 and described above. When the LB slave 39 is in the state 404 and 406 and the selected microbus slave asserts the DTACK line to acknowledge that it has completed reading or writing data, the MBC 26 responds by going to state 114 and asserting the DMARY line (see FIG. 3) to signal that acknowledgement to the LB slave 39. As shown in FIG. 5 and described previously, the LB slave 39 responds to the DMARY signal by going to the state 407 in which it deasserts the micro bus 36, including the DMAREQ line, and disconnects the microbus 36 from the local bus 21.

Referring to FIG. 3, in the state 114 the MBC 26 again becomes responsive to the status of the DMAREQ line. Because the DMAREQ line is deasserted, the MBC 26 goes to the state 115. In the state 115 the MBC 26 deasserts the DMACK line and reconnects the CPU 25 to the microbus 36. The MBC 26 then returns to the IDLE state 100.

Turning back to FIG. 5, the LB slave 39 responds to the deassertion of the DMACK line by returning to its IDLE state 400. The transaction is thus completed.

When the LB slave 39 disconnects the microbus 36 from the local bus 21 in the state 407 (see FIG. 5), the transaction is completed from the viewpoint of the local bus 21. The address of the station 22 is therefore removed from the local bus 21. Referring to FIG. 6, this condition is sensed by the deadlock detector 47, which goes to the state 302, deasserts the PDMAR line, and returns to the IDLE state 300.

When the PDMAR line is deasserted, the DMA peripheral 33 is free to reattempt its communication. Having been reset as a result of the deadlock condition, however, the DMA peripheral 33 must start from scratch, by asserting the DMAREQ line and awaiting receipt of a DMACK signal.

While the above discussion proceeded in the context of a stand-alone multiprocessor system 20, the concepts and implementation described in that discussion are directly extendable to a multicomputer system (not shown) which comprises a plurality of multiprocessor systems 20 each having its local bus interfaced to a system bus by a system bus interface. For purposes of extending the concepts and implementation of the multiprocessor system 20 to the multicomputer system, the multicomputer system may be thought of as merely being a multiprocessor system of a higher hierarchy, such that the system bus has the functionality of a local bus 21, each multiprocessor system 20 assumes the functionality, from the viewpoint of the system bus, of a station 22, and each system bus interface includes the functionality of an LBC/I 34. In order to implement passive access and deadlock resolution on a multicomputer system level, the LBC/I 34 of each intelligent station 22 is expanded to include buffers akin to the buffers 28-30 (see FIG. 1), and the related functionality of the MBC 26, such that the LBC/I 34 has the capability of disconnecting the station 22 from the local bus 21 of its multiprocessor system 20 anytime the station 22 is attempting to access the system bus while a station 22 of another multiprocessor system 20 is in control of the system bus and is trying to access the local bus 20 of the former multiprocessor system 20.

Of course, it should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

What is claimed is:

1. A communication system comprising:
a communication medium;
a first and a second station adapted to access the medium for communication, the second station further adapted for access by the first station;
means for detecting access by the first station of the second station while the second station is accessing the medium; and
means responsive to the detecting means for pausing the access by the second station and for continuing the access by the second station when the first station ceases accessing the second station.

2. A communication system comprising:
a communication medium;
a first and a second station adapted to access the medium for communication, the second station further adapted for access via the medium by the first station;
means for detecting an attempt by the first station to access the second station while the second station is attempting to access the medium; and
means responsive to the detecting means for pausing the access attempted by the second station to enable the first station to access the second station, and for continuing the access attempted by the second station when the first station ceases to access the second station.

3. A communication system comprising:
(A) first communication medium;
(B) a first and a second station adapted to access the first medium for communication, the second station including
 (1) a second communication medium interfaced with the first medium, the second medium adapted for access by the first station, and
 (2) a device connected to the second medium and adapted to access the first medium via the second medium;
(C) means associated with the second station for detecting an attempt by the first station to access the second medium while the device is attempting to access the first medium; and
(D) means responsive to the detecting means for pausing the access attempted by the device to enable the first station to access the second medium, and for continuing the attempt by the device when the first station ceases to access the second medium.

4. The system of claim 3 wherein the access attempt detecting means comprise means for monitoring the first and the second medium to sense access attempts.

5. The system of claim 3 or 4 wherein the first and second stations each include addressing means, and wherein the access attempt detecting means comprise means for detecting addressing by the first station of the second station while the second station is addressing the first medium.

6. The system of claim 3 wherein the pausing and continuing means comprise means for disconnecting the device from the second medium and for reconnecting the device to the second medium.

7. The system of claim 3 wherein the pausing and continuing means comprise buffer means for selectively interfacing the device to the second medium, the buffer means being responsive to the detecting means to cease interfacing the device when access attempts are detected and to resume interfacing the device when access attempts are not detected.

8. A communication system comprising:
(A) a first communication bus,
(B) a first and a second station connected to the first bus, the second station including
 (1) a second communication bus,
 (2) means for selectively interfacing the second bus with the first bus for communication, (3) a device connected to the second bus and adapted to access the first bus thereacross, (4) a resource connected to the second bus and adapted for access thereacross, (5) means associated with the first and the second bus for detecting an attempt by the first station to access the resource while the device is attempting to access the first bus, and (6) means responsive to the detecting means for disconnecting the device from the second bus and for allowing the interface means to interface the first and second bus to enable the first station to access the resource, and further for reconnecting the device to the second bus when the first station ceases to access the resource.

9. The system of claim 8 wherein the access attempt detecting means comprise means for monitoring the first and the second bus to sense access attempts.

10. The system of claim 8 or 9 wherein the first and second stations each include addressing means and wherein the access attempt detecting means comprise means for detecting addressing by the first station of the second station while the second station is addressing the first bus.

11. The system of claim 10 wherein the addressing means of the second station are included in the device.

12. The system of claim 8 wherein the disconnecting and reconnecting means comprise buffer means for selectively interfacing the device to the second bus.

13. The system of claim 8 wherein the resource is further adapted to access the first bus across the second bus and wherein the detecting means further detect an attempt by the first station to access the resource while the resource is attempting to access the first bus, the second station further comprising means responsive to the detecting means for causing the resource to abandon the access of the first bus and to become adapted for access.

14. A communication system comprising:

(A) a first communication bus;

(B) a plurality of stations including a second station connected to the first bus, each station adapted to access another station by outputting an address of the other station on the first bus;

(C) the second station including (1) a second communication bus, (2) means for selectively interfacing the second bus with the first bus for communication, (3) a device connected to the second bus and adapted to access another station by outputting the address of the other station on the second bus, (4) a resource connected to the second bus and adapted for access thereacross, (5) bus monitoring means for detecting an address of the second station on the first bus contemporaneously with detecting an address of another station on the second bus, the monitoring means giving a first signal when the addresses are contemporaneously detected and giving a second signal when the addresses cease being contemporaneously detected, (6) control means associated with the device and responsive to the first signal by disconnecting the device from the second bus and giving a third signal, (7) the interface means responsive to the third signal by interfacing the second bus with the first bus to enable a station to access the resource, the interface means further giving a fourth signal upon ceasing to interface the second bus with the first bus, and (8) the control means further responsive to the second signal and the fourth signal by reconnecting the device to the second bus.

15. The system of claim 14 wherein the resource is further adapted to access another station via the second bus, and wherein the second station further comprises:

means associated with the resource and responsive to the first signal for causing the resource to abandon the access of another station and to become adapted for access.

16. A improved station for a communication system which includes a communication medium and a plurality of stations adapted to access the medium for communication, the improved station adapted for access by the plurality of stations and comprising:

means for detecting access by at least one of the plurality of stations of the improved station while the improved station is accessing the medium; and means responsive to the detecting means for pausing the access by the improved station to enable the at least one station to access the improved station, and for continuing the access by the improved station when the at least one station ceases accessing the improved station.

17. An improved station for a communication system which includes a communication medium and a plurality of stations adapted to access the medium for communication, the improved station adapted for access by the plurality of stations and comprising:

means for detecting an attempt by at least one of the plurality of stations to access the improved station while the improved station is attempting to access the medium; and means responsive to the detecting means for pausing the access attempted by the improved station to enable the at least one station to access the improved station, and for continuing the access attempted by the improved station when the at least one station ceases accessing the improved station.

18. An improved station for a communication system which includes a communication medium and a plurality of stations adapted to access the medium for communication, the improved station comprising:

a second communication medium adapted for interfacing with the first medium, the second medium further adapted for access by the plurality of stations;

a device connected to the second medium and adapted for accessing the first medium over the second medium;

means for detecting an attempt by at least one of the plurality of station to access the second medium while the device is attempting to access the first medium; and means responsive to the detecting means for pausing the access attempted by the device to enable the at least one station to access the second medium, and for continuing the access attempted by the device when the at least one station ceases to access the second medium.

19. The improved station of claim 18 wherein the access attempt detecting means comprise means for monitoring the first and the second medium to sense access attempts.

20. The improved station of claim 18 wherein the pausing the continuing means comprise means for disconnecting the device from the second medium and for reconnecting the device to the second medium.

21. The improved station of claim 18 wherein the pausing and continuing means comprise buffer means for selectively interfacing the device to the second medium, the buffer means being responsive to the detecting means to cease interfacing the device when access attempts are detected and to resume interfacing the device when access attempts are not detected.

22. An improved station for a communication system which includes a first communication medium and a plurality of stations adapted to access the first medium for communication, each station including addressing means, the improved station comprising:
 a second communication medium adapted for interfacing with the first medium, the second medium further adapted for access by the plurality of stations;
 a device connected to the second medium and adapted for accessing the first medium over the second medium;
 means for detecting addressing of the improved station by at least one of the plurality of stations to access the improved station while the improved station is addressing the first medium to access the first medium; and
 means responsive to the detecting means for pausing the access attempted by the device to enable the at least one station to access the second medium, and for continuing the attempt by the device when the at least one station ceases to access the second medium.

23. An improved station for a communication system which includes a first communication bus and a plurality of stations connected to the first bus, the improved station comprising:
 a second communication bus;
 means for selectively interfacing the second bus with the first bus for communication;
 a device connected to the second bus and adapted to access the first bus thereacross;
 a resource connected to the second bus and adapted for access thereacross;
 means associated with the first bus and the second bus for detecting an attempt by at least one of the plurality of stations to access the resource while the device is attempting to access the first bus; and
 means responsive to the detecting means for disconnecting the device from the second bus and for allowing the interface means to interface the first bus with the second bus to enable the at least one station to access the resource, and further for reconnecting the device to the second bus when the at least one station ceases to access the resource.

24. The improved station of claim 23 wherein the access attempt detecting means comprise means for monitoring the first bus and the second bus to sense access attempts.

25. The improved station of claim 23 wherein the disconnecting and reconnecting means comprise buffer means for selectively interfacing the device with the second bus.

26. The improved station of claim 23 wherein
 the resource is further adapted to access the first bus across the second bus, and wherein
 the detecting means further detect an attempt by the at least one station to access the resource while the resource is attempting to access the first bus, the improved station further comprising
 means responsive to the detecting means for causing the resource to abandon access of the first bus and to become adapted for access.

27. An improved station for a communication system which includes a first communication bus and a plurality of stations connected to the first bus, each station including addressing means, the improved station comprising:
 a second communication bus;
 means for selectively interfacing the second bus with the first bus for communication;
 a device connected to the second bus and adapted to access the first bus thereacross;
 a resource connected to the second bus and adapted for access thereacross;
 means associated with the first bus and the second bus for detecting addressing of the improved station by at least one of the plurality of stations to access the improved station while the improved station is addressing the first bus to access the first bus; and
 means responsive to the detecting means for pausing the access attempted by the device to enable the at least one station to access the second medium, and for continuing the attempted access by the device when the at least one station ceases to access the second medium.

28. The improved station of claim 27 wherein the addressing means of the improved station are included in the device.

29. The improved station for a communication system which includes a first communication bus and a plurality of stations connected to the first bus, each station adapted to access another station by outputting an address of the other station on the first bus, the improved station comprising:
 a second communication bus;
 means for selectively interfacing the second bus with the first bus for communication;
 a device connected to the second bus and adapted to access at least one of the plurality of stations by outputting the address of the at least one station on the second bus;
 a resource connected to the second bus and adapted for access thereacross;
 bus monitoring means for detecting the address of the improved station on the first bus contemporaneously with detecting the address of the at least one station on the second bus, the monitoring means giving a first signal when the addresses are contemporaneously detected and giving a second signal when the addresses cease being contemporaneously detected;
 control means associated with the device and responsive to the first signal by disconnecting the device from the second bus and giving a third signal;
 the interface means responsive to the third signal by interfacing the second bus with the first bus to enable the at least one station to access the resource, the interface means further giving a fourth signal upon ceasing to interface the second bus with the first bus; and the control means further responsive to the second signal and the fourth signal by reconnecting the device to the second bus.

30. The improved station of claim 29 wherein
the resource is further adapted to access at least one of the plurality of stations by outputting the address of at least one station on the second bus, and wherein the improved station further comprises
means associated with the resource and responsive to the first signal for causing the resource to abandon access of the at least one station and to become adapted for access.

31. A method of detecting and resolving deadlock in a communication system which comprises a communication medium and a first and a second station adapted to access the medium for communication, the method comprising the steps of:
detecting access by the first station of the second station while the second station is accessing the medium;
pausing the access by the second station while the first station accesses the second station; and
continuing the access by the second station when the first station ceases accessing the second station.

32. A method of detecting and resolving deadlock in a communication system which comprises a communication medium and a first and a second station adapted to access the medium for communication, the method comprising the steps of:
detecting an attempt by the first station to access the second station via the medium while the first station is attempting to access the medium;
pausing the access attempted by the second station to enable the first station to access the second station; and
continuing the access attempted by the second station when the first station ceases to access the second station.

33. A method of detecting and resolving deadlock in a communication system which comprises a first communication medium and a first and a second station adapted to access the first medium for communication, and wherein the second station includes a second communication medium interfaced with the first medium and a device connected to the second medium, the method comprising the steps of:
detecting an attempt by the first station to access the second medium while the device is attempting to access the first medium via the second medium;
pausing the access attempted by the device to enable the first station to access the second medium; and
continuing the attempt by the device when the first station ceases to access the second medium.

34. The method of claim 33 wherein the step of detecting an attempt comprises the step of monitoring the first and the second medium to sense access attempts.

35. The method of claim 33 or 34 wherein the first and second stations each include addressing means and wherein the step of detecting an attempt comprises the step of detecting addressing by the first station of the second station while the second station is addressing the first medium.

36. The method of claim 33 wherein the step of pausing comprises the step of disconnecting the device from the second medium, and wherein the step of continuing comprises the step of reconnecting the device to the second medium.

37. The method of claim 33 wherein the device is selectively interfaced to the second medium, wherein the step of pausing comprises the step of ceasing to interface the device, and wherein the step of continuing comprises the step of resuming interfacing of the device.

38. A method of detecting and resolving deadlock in a communication system which comprises a first communication bus and a first and a second station connected to the first bus, and wherein the first station includes a second communication bus, a device connected to the second bus and adapted to access the first bus thereacross, and a resource connected to the second bus and adapted for access thereacross, the method comprising the steps of:
detecting an attempt by the first station to access the resource while the device is attempting to access the first bus,
disconnecting the device from the second bus,
interfacing the first bus and the second bus for communication to enable the first station to access the resource,
reconnecting the device to the second bus when the first station ceases to access the resource.

39. The method of claim 38 wherein the step of detecting an attempt comprises the step of monitoring the first and the second bus to sense access attempts.

40. The method of claim 38 or 39 wherein the first and second stations each include addressing means and wherein the step of detecting an attempt comprises the step of detecting addressing by the first station of the second station while the second station is addressing the first bus.

41. The method of claim 38 wherein the device is selectively interfaced to the second bus, wherein the step of disconnecting comprises the step of ceasing to interface the device to the second bus, and wherein the step of reconnecting comprises the step of resuming interfacing of the device to the second bus.

42. The method of claim 38 wherein the resource is further adapted to access the first bus via the second bus, the method further comprising the steps of:
detecting an attempt by the first station to access the resource while the resource is attempting to access the first bus; and
abandoning the access by the resource of the first bus, to adapt the resource for access by the first station.

43. A method of detecting and resolving deadlock in a communication system which comprises a first communication bus and a plurality of stations including a second station connected to the first bus, each station adapted to access another station by outputing an address of the other station on the first bus, and the second station including a second communication bus, a device connected to the second bus and adapted to access another station by outputing the address of the other station on the second bus, and a resource connected to the second bus and adapted for access thereacross, the method comprising the steps of:
detecting an address of the second station on the first bus;
contemporaneously detecting an address of another station on the second bus;
disconnecting the device from the second bus;
interfacing the second bus with the first bus to enable a station to access the resource;
ceasing to interface the second bus with the first bus; and
reconnecting the device to the second bus.

44. The method of claim 43 wherein the resource is further adapted to access another station via the second bus, and wherein the step of interfacing the second bus with the first bus is preceded by the step of:
abandoning the access by the resource of a station to adapt the resource for access by a station.

* * * * *

UNITED STATES PATENT AND TRADEMARK OFFICE
CERTIFICATE OF CORRECTION

PATENT NO. : 4,494,193

DATED : January 15, 1985

INVENTOR(S) : David J. Brahm, James M. Grinn, Edward L. Hepler, John M. Sullivan It is certified that error appears in the above-identified patent and that said Letters Patent is hereby corrected as shown below:

Column 8, line 66, "Asssuming" should be --Assuming--.
Column 10, line 16, "MDS" should be --MD--.
Column 11, line 67, after "26" delete "reponds" and
    insert --responds--.
Column 12, line 14, after "becomes" delete "rsponsive"
    and insert --responsive--.

Signed and Sealed this

Twentieth Day of August 1985

[SEAL]

Attest:

DONALD J. QUIGG

Attesting Officer     Acting Commissioner of Patents and Trademarks